(12) United States Patent
Wang et al.

(10) Patent No.: US 9,189,035 B2
(45) Date of Patent: Nov. 17, 2015

(54) DISPLAY PANEL AND DISPLAY DEVICE

(71) Applicant: BOE TECHNOLOGY GROUP CO., LTD., Beijing (CN)

(72) Inventors: Dongsheng Wang, Beijing (CN); Youmei Dong, Beijing (CN); Mi Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 52 days.

(21) Appl. No.: 14/086,195

(22) Filed: Nov. 21, 2013

(65) Prior Publication Data

US 2014/0139752 A1    May 22, 2014

(30) Foreign Application Priority Data

Nov. 22, 2012  (CN) .......................... 2012 1 0478950

(51) Int. Cl.
*G02F 1/1345*    (2006.01)
*G06F 1/18*    (2006.01)
*G02F 1/1333*    (2006.01)
*G06F 1/16*    (2006.01)

(52) U.S. Cl.
CPC ............... *G06F 1/182* (2013.01); *G02F 1/1333* (2013.01); *G06F 1/1637* (2013.01); *G06F 1/1626* (2013.01); *H04M 2250/06* (2013.01)

(58) Field of Classification Search
CPC ......... H04W 84/18; H04W 4/12; H04W 4/00; H04W 76/02; H04W 8/26; H04M 1/7253; H04M 3/436; G03G 15/80; G03G 21/1652; G03G 2221/166; G06F 1/1684; G06F 1/182; H04B 1/04; H04B 1/48; H01Q 1/243; H01Q 1/2291; H01R 12/73; H04L 12/12; H04L 12/66; H04L 51/38; H04L 67/12; H04L 41/0803; H04L 41/12; H04N 21/436; H05K 2201/10136; G02F 1/133305; G02F 1/13338; G02F 1/1333; G02F 1/1345; G09G 2370/16; G09G 2380/06
USPC .......... 343/777; 361/679.01, 679.4, 736, 748, 361/814; 439/65; 324/757.02
See application file for complete search history.

(56) References Cited

U.S. PATENT DOCUMENTS

2006/0124897 A1* 6/2006 Shingai et al. ........... 252/299.01
2008/0074334 A1* 3/2008 Kang ............................ 343/702

(Continued)

FOREIGN PATENT DOCUMENTS

CN    201518192 U    6/2010
CN    202142242 U    2/2012

(Continued)

OTHER PUBLICATIONS

Extended European Search Report for European Patent Application No. 13193342.6 dated Jul. 3, 2014, 11pgs.
Partial European Search Report for European Application No. 13193342.6, dated Apr. 2, 2014; 7 pages.

(Continued)

*Primary Examiner* — Thoi Duong
(74) *Attorney, Agent, or Firm* — Ladas & Parry LLP

(57) ABSTRACT

Embodiments of the present invention disclose a display panel and a display device, the display panel comprising: a display screen, comprising: an array substrate; an opposed substrate, cell-assembled with the array substrate to form the display screen; a circuit board, provided with a control circuit for controlling the display screen thereon; and a wireless network adapter, receiving signals via a wireless network.

15 Claims, 2 Drawing Sheets

(56) References Cited

U.S. PATENT DOCUMENTS

| | | | |
|---|---|---|---|
| 2008/0143611 A1* | 6/2008 | Wang | 343/702 |
| 2009/0002546 A1* | 1/2009 | Toyoda et al. | 348/372 |
| 2012/0161697 A1 | 6/2012 | Park et al. | |

FOREIGN PATENT DOCUMENTS

| | | | | |
|---|---|---|---|---|
| CN | 202222050 U | | 5/2012 | |
| CN | 202887617 U | | 4/2013 | |
| EP | 1 603 006 | * | 7/2005 | G02F 1/16 |
| EP | 1603006 A1 | | 12/2005 | |

OTHER PUBLICATIONS

First Office Action issued by the Chinese Patent Office for Chinese Patent Application No. 201210478950.6 dated Mar. 21, 2014, eight (8) pages.

English translation of First Office Action issued by the Chinese Patent Office for Chinese Patent Application No. 201210478950.6 dated Mar. 21, 2014, five (5) pages.

English abstract of CN202222050U, one (1) page.
English abstract of CN202142242U, one (1) page.
English abstract of CN201518192U, one (1) page.
English abstract of CN202887617U, one (1) page.

* cited by examiner

DISPLAY PANEL AND DISPLAY DEVICE

CROSS REFERENCE TO RELATED APPLICATIONS

This application claims priority from Chinese National Application No. 201210478950.6 filed on Nov. 22, 2012, the contents of which are incorporated herein by reference.

TECHNICAL FIELD

Embodiments of the present invention relate to a display panel and a display device.

BACKGROUND

A flat-panel display screen refers to a display screen, with a ratio of a diagonal length of the screen to a thickness of the whole screen more than 4:1, including a liquid crystal display screen, an organic electroluminescent display screen, and the like.

The flat-panel display screen has gradually become a mostly used display screen in a display device due to its advantages of lightness, slimness, low power consumption, high luminescent brightness, wide viewing angle and the like.

Display devices provided with the flat-panel display screen mainly comprise tablet PCs, flat-screen TVs and mobile phones. As the demand for a portable flat-panel display device is on the increase, a lighter, slimmer, and more portable flat-panel display device becomes popular.

In order to connect to the internet at any moment, a card slot needs to be correspondingly reserved in a display device provided with the flat-panel display screen so that a wireless network adapter can be inserted into the card slot; however, the reserved card slot occupies a larger space of the display device, which is disadvantageous to achieve a slimmer flat-panel display device.

Additionally, a current flat-panel display device, such as a tablet PC, is provide with a rechargeable battery charged with a wired charger, and a socket and a connecting line are required; therefore, it is inconvenient to use. In the case that an advance charged rechargeable battery runs out, and can not be recharged in time, the flat-panel display device will stop working, greatly influencing the use effect. Furthermore, a current rechargeable battery often occupies a larger space of the flat-panel display device, and is considerable heavy, which is disadvantageous to achieve a slimmer flat-panel display device.

SUMMARY

Embodiments of the present invention provide a display panel and a display device, with a wireless network adapter manufactured in the display panel, such that the display device using the display panel can has a smaller device space while receiving signals from a wireless network.

An embodiment of the present invention provides a display panel, comprising: a display screen, comprising: an array substrate; an opposed substrate, cell-assembled with the array substrate to form the display screen; a circuit board, provided with a control circuit for controlling the display screen thereon; and a wireless network adapter, receiving signals via a wireless network.

In addition, an embodiment of the present invention provides a display device, comprising the display panel mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
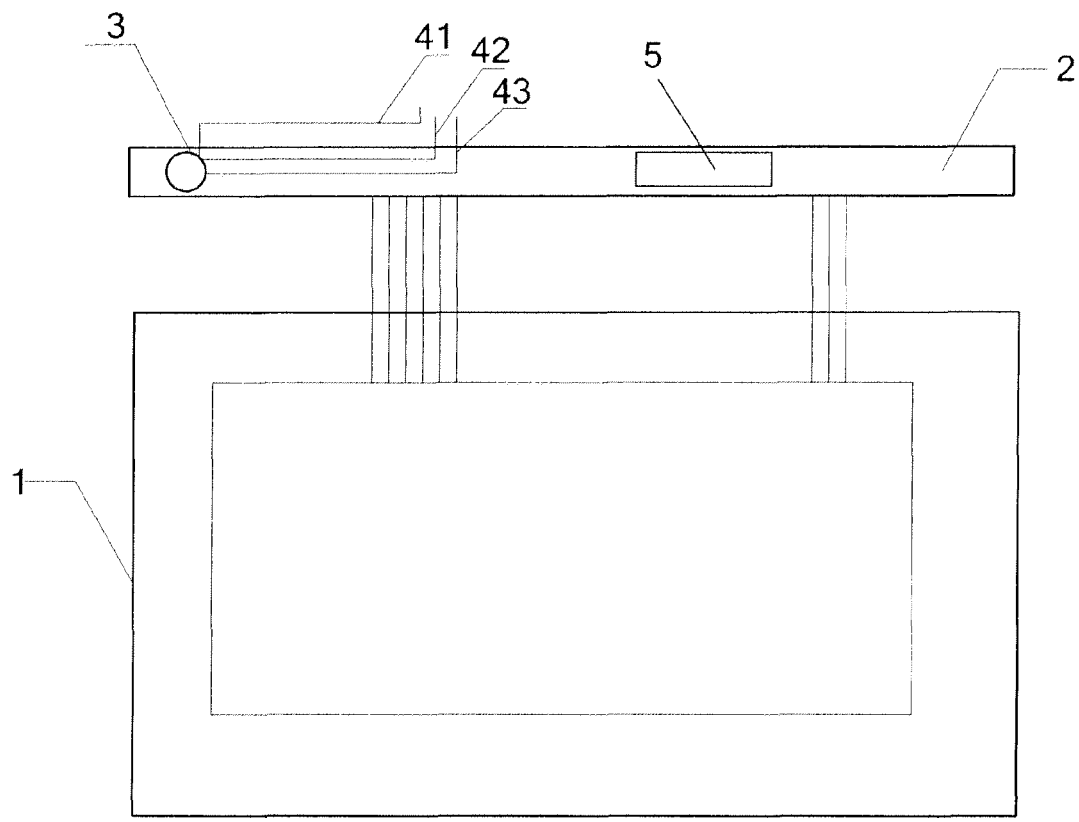
FIG. 1 is a layout view of the wireless network adapter in a display panel provided with a wireless network adapter according to an embodiment of the present invention.
Figure 2:
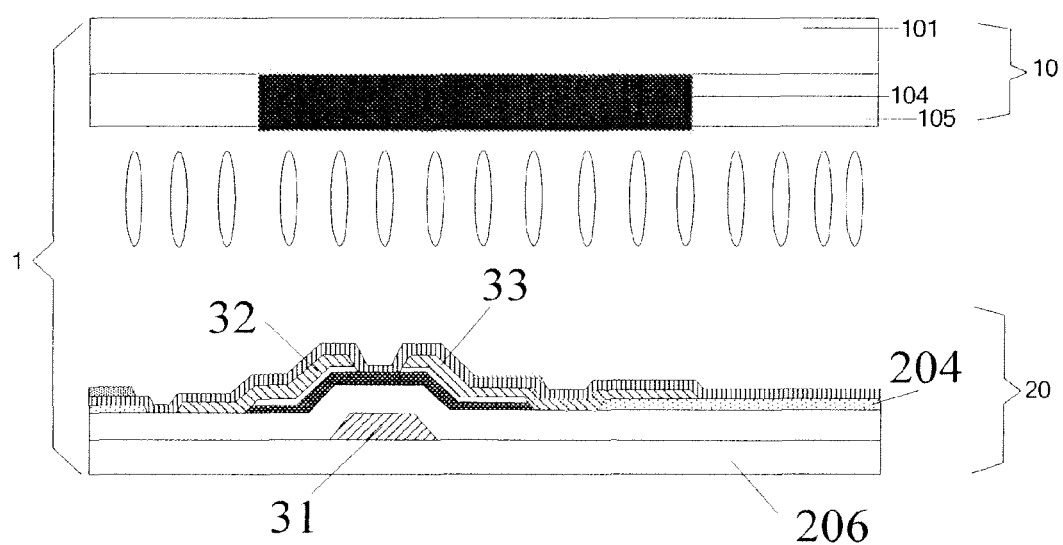
FIG. 2 shows a cross-sectional view of a display screen according to an embodiment of the present invention.
Figure 3:
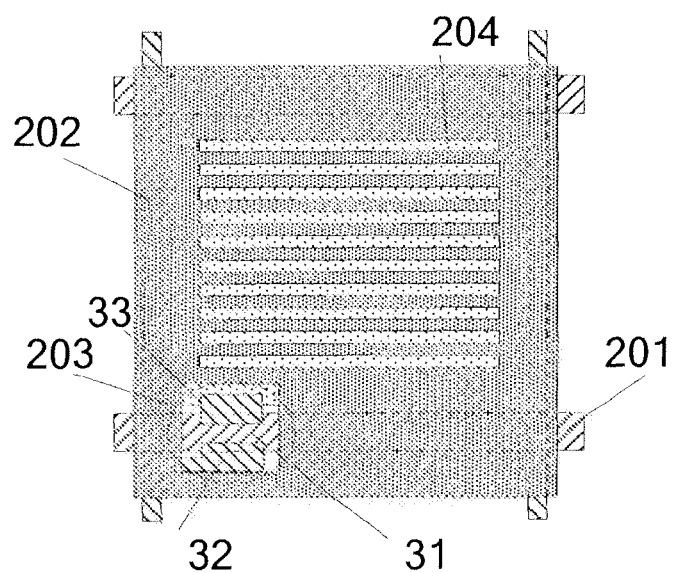
FIG. 3 is a schematic structural top view of an array substrate in the display screen according to an embodiment of the present invention.

In order to make objects, technical details and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those of ordinary skill in the art can obtain other embodiment(s), without any inventive work, which should be within the scope of the present invention.

Embodiments of the present invention provide a display panel and a display device, with a wireless network adapter manufactured in the display panel, such that the display device using the display panel can has a smaller device space while receiving signals from a wireless network.

The display panel according to an embodiment of the present invention comprises: a display screen, comprising: an array substrate; an opposed substrate, cell-assembled with the array substrate to form the display screen; a circuit board, provided with a control circuit for controlling the display screen thereon; and a wireless network adapter, receiving signals via a wireless network.

Exemplarily, the wireless network adapter is disposed on the circuit board, on the array substrate or the opposed substrate.

In this way, for the display panel according to the embodiment of the present invention, by disposing the wireless network adapter on the circuit board connected to the display screen, the display device using the display panel, such as a tablet PC and a mobile phone, can be wirelessly connected to the internet without a reserved wireless card slot or an integrated wireless network adapter, thereby reducing a total space of the display device while receiving signals via a wireless network.

Further, the wireless network adapter disposed in the display panel may receives displaying control signals for controlling the displaying of the display screen via a wireless network, so as to control the display screen to display image. In this case, the display device using the display panel, such as a flat-screen TV and a flat-panel display, can receive image signals via the wireless network to display without being connected to a set-top box, a host, and the like.

In addition, the display panel according to the embodiments of the present invention further comprises a wireless power receiver, which can charge up a battery disposed in a display device such as a tablet PC comprising the display panel or can directly provide the power for the display device, thereby a total volume of the display device can be reduced, a total weight of the display device can be decreased, the display device is more portable, it is more convenient for the display device to connect to the wireless network, and more energy is saved.

Hereafter, the display panel and the display device according to the embodiments of the present invention will be described in detail in connection with the drawings.

A thickness and a shape of various layers in the drawings do not reflect a true proportion of the array substrate, merely is illustrative and are not to scale.

Exemplarily, the display panel according to the embodiments of the present invention may be a liquid crystal display panel, an electroluminescent display panel, or another flat-panel display panel.

A First Embodiment

The first embodiment of the present invention provides a display panel comprising a wireless network adapter, FIG. 1 shows a layout view of the wireless network adapter in a display panel provided with the wireless network adapter according to the first embodiment of the present invention, wherein the wireless network adapter is disposed on a circuit board provided with a control circuit of a display screen thereon.

As shown in FIG. 1, the display panel provided by the embodiment of the present invention comprises: a display screen 1, comprising: an array substrate 20, comprising: a first base substrate 206; a plurality of data lines 202 and gate lines 201 intersecting with each other, formed on the first base substrate 206; a plurality of pixel units, defined by the gate lines the data lines intersecting with each other, each pixel unit provided with a thin film transistor 203 and a pixel electrode 204 formed on the first base substrate therein; an opposed substrate 10, cell-assembled with the array substrate 20 to form the display screen, comprising: a second base substrate 101; a color filter 105 and a black matrix 104 formed on the second base substrate; and a wireless network adapter 3, disposed on a circuit board 2 provided with a control circuit 5 of the display screen thereon, and receiving signals via a wireless network.

Exemplarily, the circuit board may be a printed circuit board (PCB) or a flexible printed circuit board (FPC), and the wireless network adapter 3 may be welded or adhered to the circuit board 2.

Exemplarily, the circuit board 2 has lead wires connecting the wireless network adapter 3 and the circuit board 2, the lead wires is connected to the wireless network adapter 3 and the circuit board 2 by welding.

Exemplarily, the lead wires may include a power lead wire 41, a data input lead wire 42 and a data output lead wire 43.

For the display panel according to the embodiment of the present invention, by disposing the wireless network adapter on the circuit board connected to the display screen 1, the display device using the display panel, such as a tablet PC and a mobile phone, can be wirelessly connected to the internet without a reserved wireless card slot or an integrated wireless network adapter, thereby reducing a total space of the display device and obtaining a lighter and slimmer flat-panel display device.

Exemplarily, the wireless network adapter 3 disposed in the display panel may receives displaying control signals for controlling the displaying of the display screen via a wireless network, so as to control the display screen to display image. In this case, the display device using the display panel, such as a flat-screen TV and a flat-panel display, can receive image signals via the wireless network to display without being connected to a set-top box, a host, and the like.

Exemplarily, the wireless network adapter 3 may receive a power via the wireless network, and the power can be used by itself and/or for the display screen 1. Herein, it should be noted that if the power received by the wireless network adapter 3 via the wireless network is used by itself, the power lead wire 41 connected to the circuit board 2 is not required, and by using an additional lead wire connected to a voltage generating circuit of the display screen, the wireless network adapter is electrically connected to the display screen to supply the power for the display screen.

Herein, it should be noted that if the wireless network adapter receives a controlling data via the wireless network, the power lead wire 42 connected to the circuit board 2 may be omitted; if the wireless network adapter receives the power via the wireless network, the power lead wire 41 may be omitted. The lead wires connecting the wireless network adapter and the circuit board 2 may be added or deleted as required, and the embodiment of the present invention is not limited to this.

Exemplarily, the wireless network adapter may be formed on the array substrate or the opposed substrate.

A Second Embodiment

Figure 4:
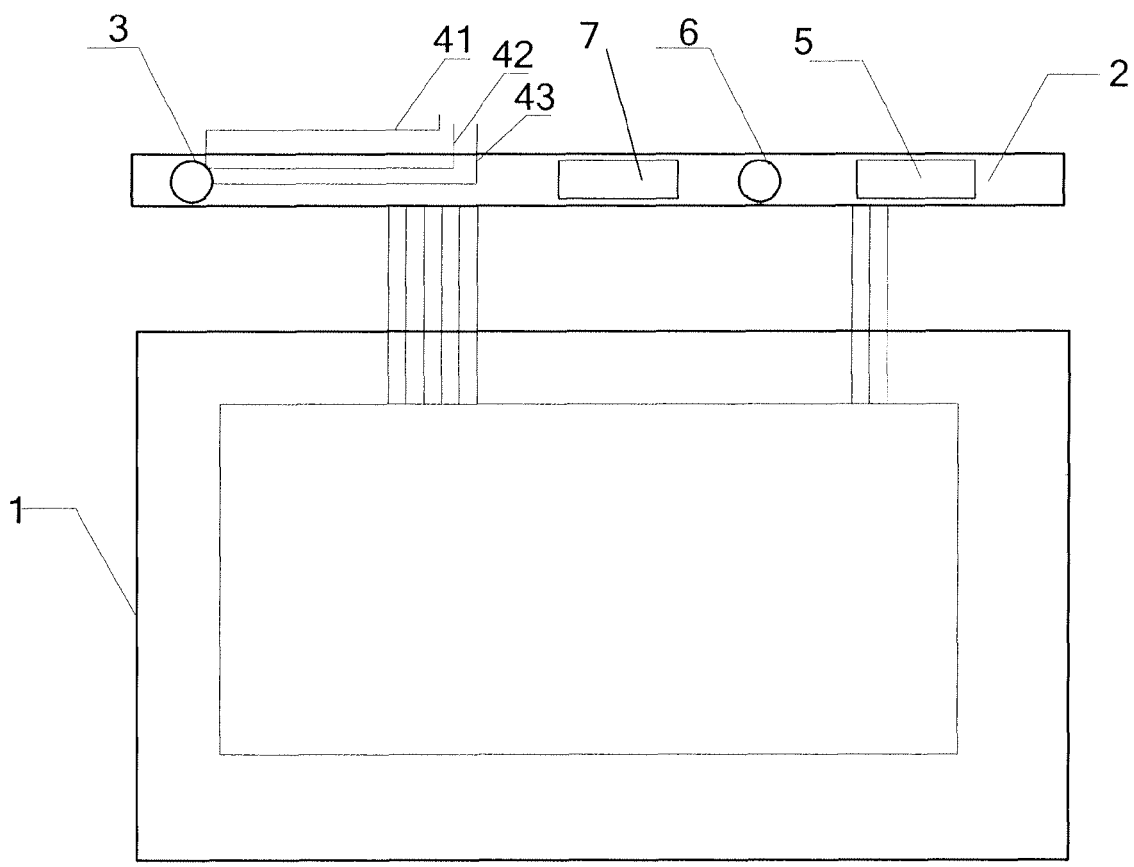
FIG. 4 is a layout view of the wireless network adapter and the wireless power receiver in the display panel comprising a wireless network adapter and a wireless power receiver according to an embodiment of the present invention.

Based on the first embodiment, the second embodiment of the present invention provides a display panel comprising a wireless network adapter and a wireless power receiver; FIG. 4 shows a layout view of the wireless network adapter and the wireless power receiver in the display panel comprising a wireless network adapter and a wireless power receiver according to an embodiment of the present invention, wherein the wireless network adapter and the wireless power receiver are disposed on a circuit board provided with a control circuit of the display screen thereon.

As shown in FIG. 4, the display panel provided by the second embodiment of the present invention comprises: a display screen 1, comprising: an array substrate 20, comprising: a first base substrate 206; a plurality of data lines 202 and gate lines 201 intersecting with each other, formed on the first base substrate 206; a plurality of pixel units, defined by the gate lines the data lines intersecting with each other, each pixel unit provided with a thin film transistor 203 and a pixel electrode 204 formed on the first base substrate therein; an opposed substrate 10, cell-assembled with the array substrate 20 to form the display screen, comprising: a second base substrate 101; a color filter 105 and a black matrix 104 formed on the second base substrate; and a wireless network adapter 3, disposed on a circuit board 2 provided with a control circuit 5 of the display screen thereon, and receiving signals via a wireless network; and a wireless power receiver 5, disposed on the circuit board 2.

The wireless power receiver 5 is one or more resonant devices, or one or more electromagnetic coils.

Exemplarily, the display panel may be provided with a battery, which is charged by the wireless power receiver 5.

Exemplarily, the circuit board 2 may further comprise a power switching circuit 7, and in the case of no any external power supplied, the power switching circuit 7 makes a switching such that the battery provides the power for the display screen and/or the wireless network adapter.

The wireless power receiver provided by the embodiment of the present invention can conveniently charge up the battery of the display panel at any moment without a socket and connecting lines, needless of worrying about a sudden power failure.

Exemplarily, the wireless power receiver provided by the embodiment of the present invention can directly provide the power for the display panel at any moment without a socket and connecting lines, needless of worrying about a sudden power failure.

The operating principle of the wireless power receiver provided by the second embodiment of the present invention will now be described in detail.

First of all, the principle of the wireless power receiver as a resonant device is explained.

The resonant device wirelessly transmits the power by using electromagnetic resonance, and the energy transmission principle of the electromagnetic resonance is in that unevenly changed electric field can generate a changed magnetic field surrounding it, while unevenly changed magnetic field can generate a changed electric field surrounding it.

Exemplarily, the wireless power receiver provided by the embodiment of the present invention comprises a receiving coil and another power supplier comprises an emitting coil. When the receiving coil and the emitting coil have the same resonant frequency (in the embodiment of the present invention, the power is transmitted by a low-frequency electromagnetic resonance), a resonance is generated upon action of a magnetic field and the power is transferred between both. The receiving coil and the emitting coil transmit the power by coupling, and further, the power can be transmitted to a power module of the display panel or a battery provided in the display panel. Further, the power only transmits between two resonant objects, and will not be diffused to other places.

Based on the same inventive concept, the embodiment of the present invention further provides a display device, comprising the aforementioned display panel.

Exemplarily, the display device according to the embodiment of the present invention may be a liquid crystal display device, an organic electroluminescent display device and the like.

Exemplarily, in a case that the display device is the liquid crystal display device, the display device further comprises a liquid crystal layer interposed between the array substrate and the counter substrate and a backlight disposed at a side opposite to the counter substrate of the array substrate.

The embodiment of the present invention provides a display panel and a display device comprising the display panel, the display panel is provides with a wireless network adapter (or the wireless network adapter and a wireless power receiver), thus, the display device with the display panel has a reduced total thickness of the device while receiving wireless network signals, thereby obtaining a lighter and slimmer display device; by replacing a socket and connecting lines, and/or a heavy battery with a wireless power receiver, not only circuit connection of the entire display device can be simplified, but also a weight of the display device can be decreased, thereby reducing the producing cost of the entire display device.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A display panel, comprising:
a display screen, comprising:
an array substrate;
an opposed substrate, cell-assembled with the array substrate to form the display screen;
a circuit board, provided with a control circuit for controlling the display screen thereon; and
a wireless network adapter, receiving signals via a wireless network,
the display panel is further provided with a battery,
the circuit board further comprises a power switching circuit provided thereon, and in the case of no external power supplied, the power switching circuit makes a switching such that the battery provides the power for the display screen and the wireless network adapter, and
the wireless network adapter is disposed on the array substrate or the opposed substrate.

2. The display panel according to claim 1, wherein the circuit board is a printed circuit board (PCB) or a flexible printed circuit board (FPC).

3. The display panel according to claim 1, wherein the circuit board is provided with lead wires connecting the wireless network adapter and the circuit board.

4. The display panel according to claim 3, wherein the lead wires are connected to the wireless network adapter and the circuit board by welding.

5. The display panel according to claim 4, wherein the lead wires include a power lead wire, a data input lead wire and a data output lead wire.

6. The display panel according to claim 3, wherein the lead wires include a power lead wire, a data input lead wire and a data output lead wire.

7. The display panel according to claim 1, wherein the wireless network adapter receives displaying control signals via the wireless network, and the wireless network adapter is connected to the control circuit of the display screen by lead wires to supply the displaying control signals for the display screen.

8. The display panel according to claim 1, further comprising: a wireless power receiver, disposed on the circuit board.

9. The display panel according to claim 8, wherein the battery is charged by the wireless power receiver.

10. The display panel according to claim 9, wherein the battery provides a power for the display screen and the wireless network adapter.

11. The display panel according to claim 8, wherein the wireless power receiver comprises one or more resonant devices.

12. The display panel according to claim 8, wherein the wireless power receiver comprises one or more electromagnetic coils.

13. The display panel according to claim 8, wherein the wireless power receiver directly provides the power for the display screen and the wireless network adapter.

14. A display device, comprising the display panel according to claim 1.

15. The display device according to claim 14, wherein the display panel is the liquid crystal display panel, the display device further comprises a liquid crystal layer interposed between the array substrate and the counter substrate and a backlight disposed at a side opposite to the counter substrate of the array substrate.

* * * * *